United States Patent
Liu (10) Patent No.: US 10,175,785 B2
(45) Date of Patent: Jan. 8, 2019

(54) METHOD FOR CONTROLLING DEFORMABLE ELECTRONIC DEVICE AND DEFORMABLE ELECTRONIC DEVICE

(71) Applicants: Beijing Lenovo Software Ltd., Beijing (CN); Lenovo (Beijing) Co., Ltd., Beijing (CN)

(72) Inventor: Junfeng Liu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 100 days.

(21) Appl. No.: 14/494,881

(22) Filed: Sep. 24, 2014

(65) Prior Publication Data
US 2015/0268749 A1 Sep. 24, 2015

(30) Foreign Application Priority Data
Mar. 24, 2014 (CN) .......................... 2014 1 0111712

(51) Int. Cl.
G06F 3/041 (2006.01)
G06F 1/16 (2006.01)
G06F 3/0487 (2013.01)

(52) U.S. Cl.
CPC ............ G06F 3/041 (2013.01); G06F 1/1694 (2013.01); G06F 3/0414 (2013.01); G06F 3/0487 (2013.01); G06F 2203/04102 (2013.01)

(58) Field of Classification Search
CPC ......... G06F 2203/04102; G06F 1/1652; G06F 1/1694; G06F 3/041; G06F 3/0414; G06F 3/0487; G09G 2380/02
See application file for complete search history.

(56) References Cited

U.S. PATENT DOCUMENTS

| | | | |
|---|---|---|---|
| 2003/0227441 A1* | 12/2003 | Hioki | G06F 3/0412 345/156 |
| 2004/0008191 A1* | 1/2004 | Poupyrev | G06F 3/011 345/184 |
| 2010/0141605 A1* | 6/2010 | Kang | G06F 1/1626 345/174 |
| 2010/0247133 A1* | 9/2010 | Sugahara | B41J 29/38 399/81 |

(Continued)

*Primary Examiner* — Keith L Crawley
(74) *Attorney, Agent, or Firm* — Harness, Dickey & Pierce, P.L.C.

(57) ABSTRACT

A method for controlling an electronic device, and an electronic device are provided. The electronic device is a deformable electronic device. The method includes: if a wave motion transmitted gradually from a first region to a second region of the electronic device occurs in the electronic device, acquiring a parameter related to the wave motion; and determining a control instruction at least based on the parameter. The control instruction is executable to implement a function corresponding to the control instruction. The method determines the control instruction based on the wave motion that occurs in the electronic device; hence the method is tightly combined with a deformable characteristic of the electronic device and is novel. Further, the control method can be used as long as the wave motion occurs in the electronic device, thereby simplifying multiple steps in conventional control methods and causing a convenient and humanized control method.

8 Claims, 7 Drawing Sheets

(56) References Cited

U.S. PATENT DOCUMENTS

| | | | |
|---|---|---|---|
| 2011/0227822 A1* | 9/2011 | Shai | G06F 1/1615 345/156 |
| 2012/0115422 A1* | 5/2012 | Tziortzis | G06F 3/01 455/73 |
| 2012/0139834 A1* | 6/2012 | Han | G06F 3/03 345/157 |
| 2013/0093660 A1* | 4/2013 | Hirsch | G06F 1/1652 345/156 |
| 2013/0120239 A1* | 5/2013 | Suzuki | G06F 1/1643 345/156 |
| 2014/0055375 A1* | 2/2014 | Kim | G06F 1/1652 345/173 |
| 2014/0078046 A1* | 3/2014 | Seo | G06F 1/1652 345/156 |

* cited by examiner

METHOD FOR CONTROLLING DEFORMABLE ELECTRONIC DEVICE AND DEFORMABLE ELECTRONIC DEVICE

CROSS REFERENCES OF RELATED APPLICATION

The present application claims the priority to Chinese Patent Application No. 201410111712.0, entitled "METHOD FOR CONTROLLING ELECTRONIC DEVICE, AND ELECTRONIC DEVICE", filed on Mar. 24, 2014 with the State Intellectual Property Office of People's Republic of China, which is incorporated herein by reference in its entirety.

FIELD

The disclosure relates to the field of electronic technologies, and particularly to a method for controlling an electronic device, and an electronic device.

BACKGROUND

With the development of electronic technologies, more and more electronic devices come out and become important for people's work and life. Further, in order to satisfy different requirements of users, the existing electronic devices are diversified, such as cell phones, tablet computers and notebook computers. In addition, the electronic devices have various types, such as a flip type, a bar type, the electronic devices may be provided with a metal case or a plastic case, and the electronic device may be transparent or flexible.

However, there is no convenient solution to control flexible device at present.

SUMMARY

A method for controlling an electronic device and an electronic device are provided according to embodiments of the disclosure.

In one aspect, a method is provided in the disclosure. The method includes: acquiring a parameter related to the wave motion associated with an electronic device, in the case that a wave motion transmitted gradually from a first region of the electronic device to a second region of the electronic device occurs; and determining a control instruction at least based on the parameter. The control instruction is executable to implement a function corresponding to the control instruction.

Optionally, the acquiring the parameter related to the wave motion may include: collecting data, by multiple sensors of the electronic device, to acquire the parameter related to the wave motion, where data collected by at least two of the multiple sensors at a same time are different, or data collected by at least two of the multiple sensors at different time are consistent.

Optionally, acquiring the parameter related to the wave motion may include: acquiring the parameter by detecting amplitude, frequency, and times of the wave motion in the first region, in the case that the wave motion is triggered at the first region; or acquiring the parameter by detecting amplitude, frequency, and times of the wave motion in at least one predetermined region different from the first region, in the case that the wave motion is triggered at the first region; or acquiring the parameter by detecting quantity of convex portions and concave portions generated by the wave motion in a wave motion process through a detection.

Optionally, in the case that the wave motion is triggered at the first region, the method may further include: determining a position of the first region, and determining the control instruction may include: determining the control instruction based on the position and the parameter.

Optionally, determining the position of the first region may include: in the case that there is one first region, determining that the first region is located at one side, one corner or a central region of the electronic device; or in the case that there are two first regions, determining that the first regions are located at opposite sides or opposite corners of the electronic device.

Optionally, after determining the control instruction, the method may further include: executing the control instruction to determine a display object at a first position on a display unit of the electronic device, determining a second position on the display unit, and adjusting display positions of the display object from the first position to the second position.

Optionally, determining the second position on the display unit may include: determining a direction of gravity and determining the second position based on the first position and the direction of gravity, where a direction from the first position to the second position is same as the direction of gravity; or determining a transmission direction of the wave motion and determining the second position based on the first position and the transmission direction, where a direction from the first position to the second position is same as the transmission direction.

Optionally, after determining the control instruction at least based on the parameter, the method may further include:

executing the control instruction to determine a content which requires to be cleaned up, and executing a cleanup operation to clean up the content.

Optionally, after determining the control instruction at least based on the parameter, the method may further include:

executing the control instruction to switch power states of the electronic device from a first power state to a second power state, where the first power state is different from the second power state.

In another aspect, an electronic device is provided in the disclosure. The electronic device includes: a main body; a parameter acquisition for acquiring a parameter related to the wave motion in the case that a wave motion transmitted gradually from a first region of the electronic device to a second region of the electronic device occurs, where the parameter acquisition unit is attached to the main body; a processing unit for determining a control instruction at least based on the parameter, the control instruction being executable to implement a function corresponding to the control instruction and the processing unit is coupled to the main body.

Optionally, the parameter acquisition unit may include multiple sensors, data collected by at least two of the multiple sensors at a same time are different, or data collected by at least two of the multiple sensors at different time are consistent.

Optionally, the parameter acquisition unit may be for, detecting amplitude, frequency, and times of the wave motion in the first region, in the case that the wave motion is triggered at the first region; or detecting amplitude, frequency, and times of the wave motion in at least one predetermined region different from the first region, in the case that the wave motion is triggered at the first region; or detecting quantity of convex portions and concave portions generated by the wave motion in a wave motion process.

Optionally, the electronic device may further include a position determination unit for determining a position of the first region in the case that the wave motion is triggered at the first region, and the processing unit may be for determining the control instruction based on the position and the parameter.

Optionally, the position determination unit may be for, determining that the first region is located at one side, one corner or a central region of the electronic device, in the case that there is one first region; or determining that the first regions are located at opposite sides or opposite corners of the electronic device, in the case that there are two first regions.

Optionally, the electronic device may further include a display unit, which is deformable in response to the wave motion, and the processing unit may be further for executing the control instruction to determine a display object at a first position on the display unit, determining a second position on the display unit, and adjusting a display position of the display object from the first position to the second position.

Optionally, the processing unit may be for, determining a direction of gravity and determining the second position based on the first position and the direction of gravity, where a direction from the first position to the second position is same as the direction of gravity; or determining a transmission direction of the wave motion and determining the second position based on the first position and the transmission direction, where a direction from the first position to the second position is same as the transmission direction.

Optionally, the processing unit may be further for, executing the control instruction to determine a content which requires to be cleaned up and executing a cleanup operation to clean up the content.

Optionally, the processing unit may be further for executing the control instruction to switch power states of the electronic device from a first power state to a second power state, where the first power state is different from the second power state.

DETAILED DESCRIPTION OF THE EMBODIMENTS

A method for controlling an electronic device, and an electronic device are provided according to embodiments of the disclosure, for solving a conventional technical problem that it is not convenient to control a deformable electronic device.

A general conception of a technical solution in the embodiments of the disclosure is described as follows.

According to an embodiment of the disclosure, for a deformable electronic device, when a wave motion transmitted gradually from a first region of the electronic device to a second region of the electronic device occurs in the electronic device, a parameter related to the wave motion is acquired, and a control instruction is determined at least based on the parameter. The control instruction is executable to implement a function corresponding to the control instruction. As illustrated, the method according to the embodiment determines the control instruction based on the wave motion that occurs in the electronic device; hence controlling of the electronic device is tightly combined with a deformable characteristic of the electronic device and this control method is novel. Further, this control method can be used as long as the wave motion occurs in the electronic device, thereby simplifying multiple steps in a conventional control method, and causing a convenient and humanized control method.

For obtaining a better understanding, the above technical solution is described in detail hereinafter in conjunction with drawings and specific embodiments.

A method for controlling an electronic device is provided according to an embodiment of the disclosure. The electronic device may be a deformable electronic device. The electronic device may not include a display unit, and may serve as an input control apparatus to implement functions similar to those of a mouse, a touchpad and a keyboard. Or the electronic device may include a display unit and serve as an independent apparatus such as a cell phone or a tablet computer.

The method for controlling the electronic device according to the embodiment is introduced hereinafter in conjunction with FIG. 1. The method includes the following steps 201 and 202.

In the step 201, in the case that a wave motion transmitted gradually from a first region of the electronic device to a second region of the electronic device occurs in the electronic device, a parameter related to the wave motion is acquired.

In the step 202, a control instruction is determined at least based on the parameter. The control instruction is executable to implement a function corresponding to the control instruction.

As illustrated above, according to the embodiment, the control instruction is determined based on the wave motion that occurs in the electronic device. Hence, a user may control the electronic device by triggering the electronic device to generate the wave motion. This novel control mode is convenient and humanized.

Hereinafter, how to trigger the electronic device to generate the wave motion transmitted from the first region of the electronic device to the second region of the electronic device is introduced. There are two cases of a location of the first region, i.e., the first region may be located at an edge region or at a central region of the electronic device. The edge region refers to a region in which a shortest distance from an edge is smaller than a predetermined value, and the remaining region expect for the edge region may be referred to as the central region. Or a region around the center of the electronic device may be referred to as the central region. For example, the central region may be a circular region having the center of the electronic device as the center and having a predetermined radius, the predetermined radius being smaller than a shortest distance from the center to the edges. For another example, the central region may be a region which has a same center and a same shape as the electronic device, while the central region has a smaller size when compared with the electronic device.

In a first case, the first region is located at the edge region, and the electronic device is triggered to generate the wave motion at the first region. In the embodiment, there may be two situations with different numbers of the first regions, but the first case is not limited thereto.

In a first situation, there is one first region, and the first region refers to one side or one corner of the electronic device. In this situation, an operator holds the electronic device at the first region to shake back and forth. One time of shaking the electronic device back and forth means that the operator continuously performs a first movement in a first direction of applying force and a second movement in a second direction of applying force, the first direction of applying force being different from the second direction of applying force. Specifically, for example, a user holds the electronic device at the first region with the operator and performs a shaking movement, and then the wave motion generated at a holding side may be transmitted to a side opposite to the holding side, thereby causing an undulating movement. In the embodiment, the second region is opposite to the first region.

Figure 2A:
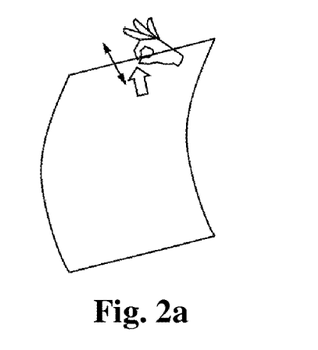
FIGS. 2a to 2d are schematic diagrams showing various positions at which a wave motion is triggered according to an embodiment of the disclosure.
Figure 2B:
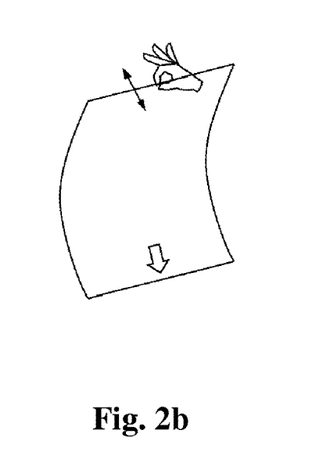
Figure 2C:
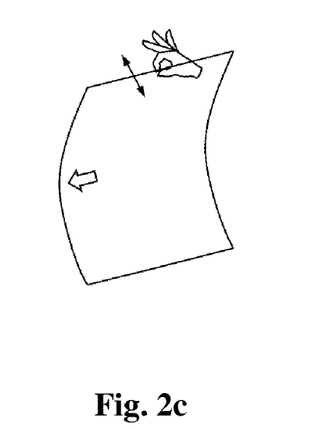
Figure 2D:
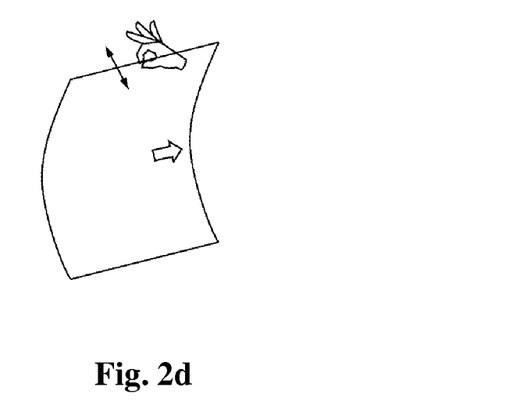

FIGS. 2a to 2d respectively show that the user holds the electronic device at four edge positions with a hand to shake the electronic device. Hollow arrows in the four figures represent a first side. In FIG. 2a, it is indicated that the user holds the electronic device at the first side; in FIG. 2b, it is indicated that the user holds the electronic device at a second side opposite to the first side; in FIG. 2c, it is indicated that the user holds the electronic device at a third side which is adjacent to the first side and is on the left of the first side; and in FIG. 2d, it is indicated that the user holds the electronic device at a fourth side which is adjacent to the first side and is on the right of the first side.

In addition, solid two-way arrows in the four figures represent the first direction of applying force and the second direction of applying force along which the user shakes the electronic device with the hand. Furthermore, as shown in FIG. 3, when the user holds the electronic device at the first region and shakes the electronic device along directions indicated by the solid two-way arrows shown in FIGS. 2a to 2d, a movement transmitted in a wavelike form from the first region to the second region occurs in the electronic device.

Figure 3:
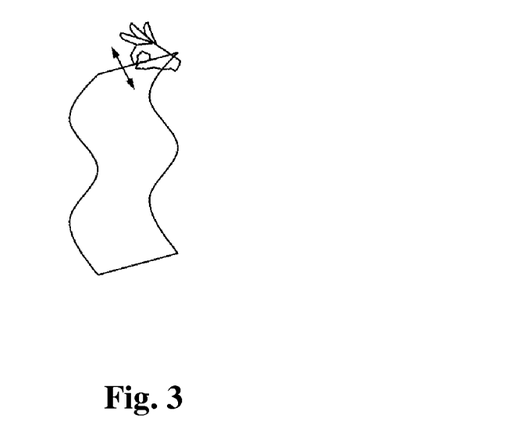
FIG. 3 is a schematic diagram showing that a wave motion occurs in an electronic device according to an embodiment of the disclosure.

FIGS. 2a to 3 only illustrate a case that the first region is one side of the electronic device. In practice, the first region may alternatively be one corner of the electronic device. The corner may be an overlap region of two adjacent edge regions. If the wave motion is triggered within the overlap region, it may be considered that the first region is one corner. Or if the wave motion is triggered at other parts of the edge region that are different from the overlap region, it may be considered that the first region is one side.

In the embodiment described above, in the case that the wave motion is triggered at the first region, one side or corner opposite to the first region, or other sides are free sides, that is, there is only one holding position. In another possible implementation of the embodiment, the side or corner opposite to the first region or other sides may also be fixed, for example, they are also held by the user. However, the shaking is only performed at the first region rather than the other fixed sides. In other words, a first operator holds the electronic device at the first region and shakes back and forth, and a second operator holds the electronic device at a fixed side opposite to the first region and keeps still. In the embodiment, the second region refers to other regions except for the first region and the fixed side(s).

In a second situation, there are two first regions, and the first regions are two opposite sides or two opposite corners of the electronic device.

In the second situation, conceptions of the side and the corner are similar to those described in the first situation and are not repeated here. In the situation with two first regions, two sub-situations are further included based on whether the wave motion is triggered simultaneously at the two first regions. In one sub-situation, the wave motion is alternatively triggered at the two first regions, that is, a first operator holds the electronic device at one of the two first regions to shake back and forth at a first time instant, and a second operator holds the electronic device at the other one of the two first regions to shake back and forth at a second time instant, and the first time instant alternates with the second time instant. In the other sub-situation, the wave motion is triggered simultaneously at the two first regions, that is, the first operator holds the electronic device at one of the two first regions to shake back and forth, and meanwhile, the second operator holds the electronic device at the other one of the two first regions to shake back and forth.

For the sub-situation that the wave motion is alternatively triggered at the two first regions, for example, the user holds the electronic device at two opposite edges respectively with his left hand and right hand, firstly, the left hand keeps still and the right hand performs the shaking movement, and then, the second hand keeps still and the left hand performs the shaking movement.

For the sub-situation that the wave motion is triggered simultaneously at the two first regions, for example, the user holds the electronic device at two opposite edges respectively with his left hand and right hand, and then the left hand and the right hand perform the shaking movement simultaneously.

In a second case, the first region is the central region, and the electronic device is triggered to generate the wave motion at the first region. For example, the user touches the central region of the electronic device with a finger, and similar to a phenomenon that water marks spread in all directions, a wave motion spreading out from the central region occurs in the electronic device. In the second case, there is one first region.

Multiple cases and situations in which the electronic device is triggered to generate the wave motion are described above. Hereinafter, an implementation of the step 201 is introduced in detail, that is, how to acquire the parameter related to the wave motion is introduced.

According to an embodiment, the electronic device further includes multiple sensors distributed at different positions of the electronic device. For example, the multiple sensors may be arranged into an array to detect wave motion parameters in multiple directions, or the multiple sensors may be linearly arranged to detect wave motion parameters in a linear direction. The step 201 includes: acquire the parameter related to the wave motion based on data collected by the multiple sensors. The data collected by at least two of the multiple sensors at a same time instant are different. The at least two sensors are two adjacent sensors in a transmission direction of the wave motion. At a same time instant, the wave motion occurs in the electronic device and different deformations occur at two positions of the at least two sensors; therefore the data collected at the two positions are different. In addition, the data collected by at least two of the multiple sensors at different time instants are consistent. At different time instants, similar waveforms occur at the positions of the two sensors since a waveform propagates in the transmission direction; therefore the data collected by the two sensors are substantially consistent. Under consideration of attenuation of the wave motion, the data collected by the two sensors at different time instants may not be completely same, but may be consistent in values, for example, a difference between the data collected by the two sensors is within a reasonable range. The above cases may also be applied to two sensors which are not adjacent in the transmission direction of the wave motion.

Further, data collected sequentially by the multiple sensors in the transmission direction of the wave motion are also consistent, since the data is collected in a same wave motion process.

Figure 4:
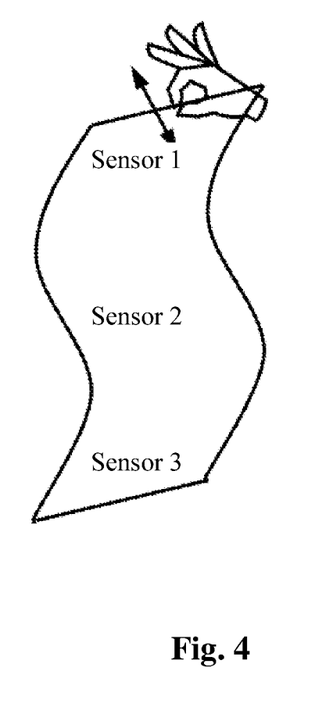
FIG. 4 is a schematic diagram showing positions for placing sensors according to an embodiment of the disclosure.

As shown in FIG. 4, three acceleration sensors 1, 2 and 3 are arranged on the electronic device, and the three sensors are linearly arranged. Sensor 1 and sensor 2 are two sensors adjacent in the transmission direction of the wave motion. In the time instant state shown in FIG. 4, sensor 1 and sensor 2 are located at different deformation positions, therefore data collected by sensor 1 and sensor 2 are different. Further, for sensor 1 and sensor 3, in the time instant state shown in FIG. 4, although the two sensors are located at different positions, they are located at similar waveform positions, therefore data collected by the two sensors are consistent. Further, for sensor 1 and sensor 2, although they are located at different positions, similar deformations may occur at the two positions at different time instants since the waveform propagates in the transmission direction of the wave motion, therefore the data collected by sensor 2 at a present time instant is consistent with the data collected by sensor 1 at some previous time instant. Considering the attenuation, the data collected by the two sensors may not be completely same, but are consistent.

Further, the data collected sequentially by the acceleration sensors 1, 2 and 3 in the transmission direction of the wave motion are consistent, indicating a same wave motion.

In practice, before the electronic device leaves the factory, it may be triggered by a research personnel to generate different wave motions, and the data collected by each sensor in condition of different wave motions may be recorded and stored in the electronic device.

As described above, the parameter related to the wave motion may be obtained through detections of the multiple sensors. In practice, other detection approaches may also be used to obtain the parameter related to the wave motion, which is not limited in the disclosure. In the following, the parameter which may be acquired is introduced.

In one possible implementation, in the case that the wave motion is triggered at the first region, at least one of amplitude, frequency, and times of the wave motion in the first region may be obtained through a detection, and the detection may be performed by a sensor located at the first region.

In another possible implementation, in the case that the wave motion is triggered at the first region, at least one of amplitude, frequency, and times of the wave motion in at least one predetermined region different from the first region may be obtained through a detection. The at least one predetermined region is a part of the second region.

In the above two implementations, the times of the wave motion refer to the number of times that the first movement in the first direction of applying force and the second movement in the second direction of applying force are performed continuously, the first direction of applying force being different from the second direction of applying force.

Figure 5A:
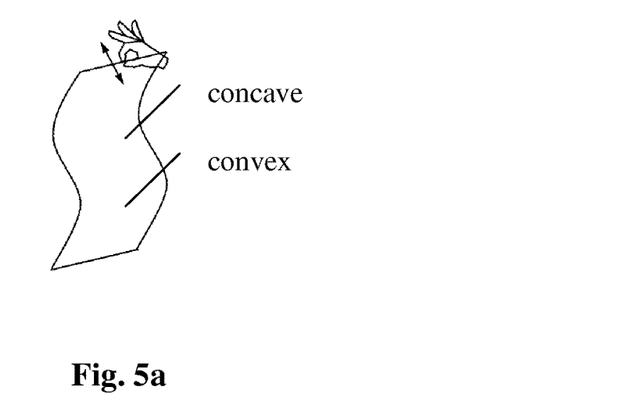
FIGS. 5a to 5c are schematic diagrams showing different quantities of convex and concave portions generated by the wave motion according to an embodiment of the disclosure.
Figure 5B:
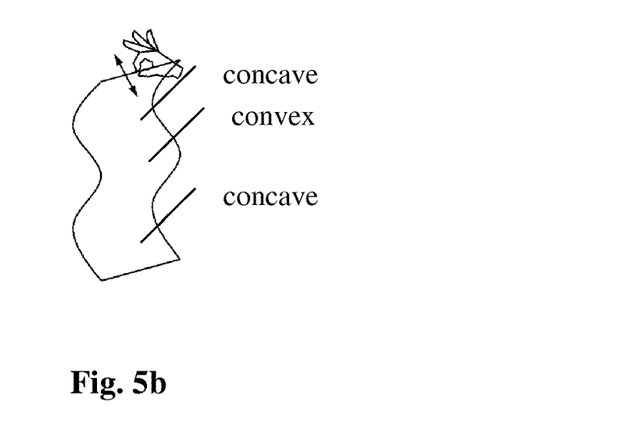
Figure 5C:
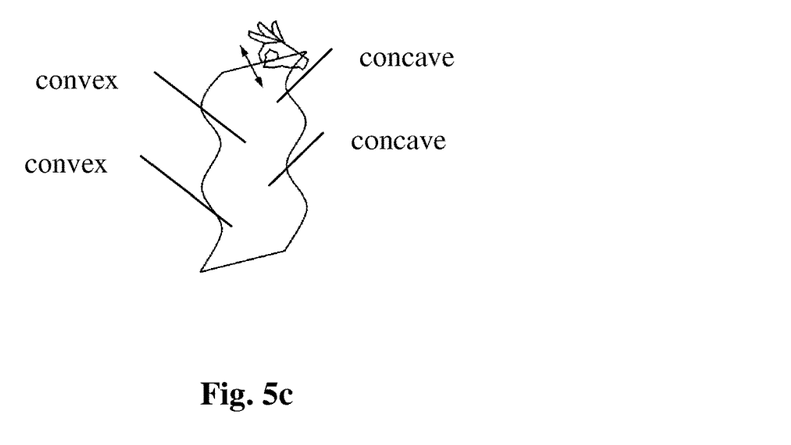

In yet another possible implementation, the quantity of convex portions and concave portions generated by the wave motion in the wave motion process may be obtained through a detection. The convex portion and the concave portion are relative conceptions, and therefore the quantity is calculated based on a same reference plane in the detection. For example, a plane where a display unit is located is set as the reference plane. As shown in FIG. 5a, there is one concave portion and one convex portion; as shown in in FIG. 5b, there are two concave portions and one convex portion; and as shown in FIG. 5c, there are two concave portions and two convex portions.

After the step 201 is finished, the step 202 is performed, that is, the control instruction is determined at least based on the parameter. Specifically, for example, the data detected by each sensor in conditions of different wave motions or individual parameters obtained from the data are stored in the electronic device as described above, a correspondence between the data or the individual parameters and control instructions may also be stored in the electronic device. Therefore, in the case that the parameter related to the wave motion is obtained by the sensor, the control instruction may be determined by searching the correspondence.

Further, in the case that the wave motion is triggered at the first region, the method in the embodiment further includes, before the step 202, determining a position of the first region. Then the step 202 includes: determining the control instruction based on the position and the parameter. That is, a trigger position and the wave motion are comprehensively considered to collectively determine the control instruction. In this way, more control modes may be implemented.

Determining the position of the first region includes: in the case that there is one first region, determining that the first region is one side, one corner or the central region of the electronic device; or in the case that there are two first regions, determining that the first regions are two opposite sides or two opposite corners of the electronic device. Regarding the position of the first region and how to trigger the wave motion, the above description may be referred to.

Determination of which side or which corner the first region is located at may be achieved by a detection of a pressure sensor. In practice, other detection approaches may also be used. For example, by detecting whether there is transmitted light at a position, it may be determined whether the position is shaded, thereby determining whether the electronic device is held at the position.

After the step 202 is finished, i.e., after the control instruction is determined, the method in the embodiment further includes: executing the control instruction to achieve the function corresponding to the control instruction.

In practice, there may be various control instructions, and many functions may be achieved accordingly. In the following, it is illustrated by several examples.

Figure 6A:
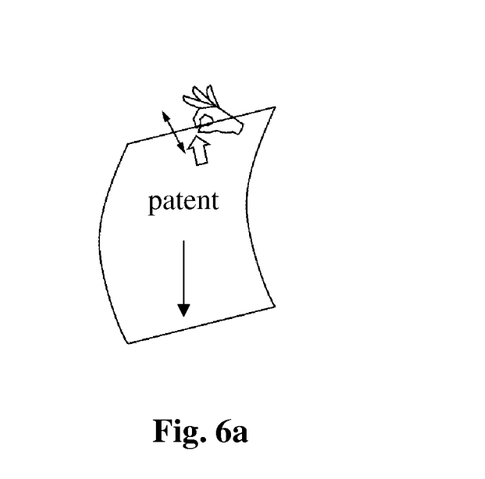
FIGS. 6a and 6b are schematic diagrams showing an adjustment of display positions of a display object according to an embodiment of the disclosure.

As a first example, in the embodiment, the electronic device further includes a display unit which is deformable in response to the wave motion. Executing the control instruction includes: determining a display object at a first position on the display unit; determining a second position on the display unit; and adjusting a display position of the display object from the first position to the second position. As shown in FIG. 6a, the display object at the first position on the display unit is determined as a word "patent"; then the second position on the display unit different from the first position is determined; and finally, the word "patent" is moved from the original first position to the second position to be displayed.

There may also be multiple implementations for determining the display object at the first position on the display unit, and multiple determination approaches may be set based on actual requirements.

In a first possible implementation, at least one object at a region different from the region where the wave motion is triggered is determined as the display object, and the display position of the display object is the first position.

For instance, it is assumed that the wave motion is triggered at the first region by the user, e.g., the user holds the electronic device at the first region with his hand and shakes the electronic device back and forth, then at least one object at a region different from the first region is determined as the display object. Further for instance, if the user presses on one display object to trigger the wave motion, at least one of other display objects except for the display object pressed by the user is determined as the display object.

In a second possible implementation, a non-process object is determined based on an operation, and then at least one of other objects expect for the non-process object is determined as the display object.

For instance, a first operator holds the electronic device at an edge (at which there is no object) to trigger the wave motion, and a second operator selects the non-process object during the wave motion process, for example, the second operator presses on the non-process object, and then other objects may be the display object.

Figure 6B:
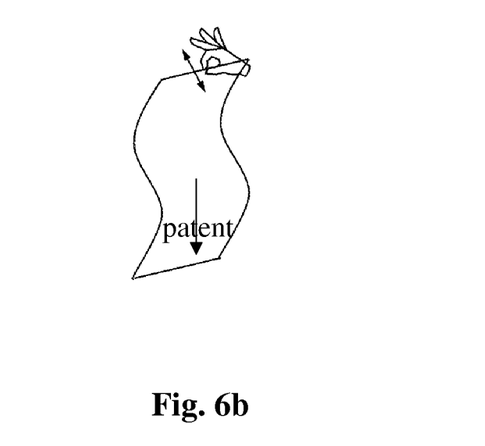

Further, determining the second position on the display unit includes: determining a direction of gravity, and determining the second position based on the first position and the direction of gravity, where a direction from the first position to the second position is same as the direction of gravity. As shown in FIGS. 6a and 6b, solid one-way arrows therein indicates the direction of gravity, the second position is determined based on the first direction and the direction of gravity. The second position is located downstream along the direction of gravity and the first position is located upstream along the direction of gravity, therefore the direction from the first position to the second position is same as the direction of gravity. Such an operation is close to real life, for example, an object located at a higher position is shaken down; therefore the user may become familiar with the operation without paying too much learning cost. For another example, in the case that long sides of the electronic device is parallel to the horizontal plane but the display unit is not parallel to the horizontal plane, and the user triggers the wave motion at a short side, here the transmission direction of the wave motion is different from the direction of gravity, however, a display object close to the long side at a top portion of the electronic device may change the display position to a position close to the long side at a bottom portion of the electronic device, achieving an effect of shaking down, that is, the display object may change the display position along the direction of gravity.

Alternatively, the transmission direction of the wave notion is determined and the second position is determined based on the first position and the transmission direction, where a direction from the first position to the second position is same as the transmission direction. As shown in FIGS. 6a and 6b, the direction of gravity is same as the transmission direction of the wave motion. However, in practice, the transmission direction of the wave motion may be different from the direction of gravity. For example, the electronic device is placed horizontally and then the wave motion is triggered, in this case, the transmission direction of the wave motion is perpendicular to the direction of gravity, and the solution in the embodiment may be utilized to determine the second position. In the embodiment, since the display position of the display object is moved from the upstream of the wave motion to the downstream of the wave motion, the direction from the first position to the second position is same as the transmission direction of the wave motion.

Alternatively, in the case that the wave motion is triggered at the central region, display objects within a predetermined range of the central region are diffused to be displayed at second positions out of the predetermined range, where at least two of the display objects have different second positions. For example, when the user utilizes an operator to trigger the wave motion at the central region of electronic device, the display objects at the central region are diffused in all directions, as if these display objects are shaken out from the center to surrounding regions.

In the above, it is illustrated by taking the case that the display position of the display object is changed as an example, this mode is intuitive and it is convenient for the user to operate. Further, the mode may also be applied to window management or process management. For example, if the user wants to minimize windows except for one window, the user may hold the electronic device on the one window to trigger the wave motion, or the user may utilize one hand to hold the electronic device at an edge to trigger the wave motion, and may utilize the other hand to press the one window, then other windows displayed on the display unit may be minimized, which may also be referred to, in essence, as a change of the display position. A same principle may also be applied to the process management, and it is not repeated here.

In the example of achieving a function of adjusting the display position, a mode with which the electronic device is triggered to generate the wave motion may be, for example, the above trigger mode described in the foregoing first situation. A combination of such a trigger mode and the function is close to habits in real life, thereby making a control operation more convenient and humanized.

As a second example, the control instruction is executed to achieve a cleanup function. Specifically, the control instruction is executed to determine a content which requires to be cleaned up, and to execute a cleanup operation to clean up the content.

The content which requires to be cleaned up may be a program which is running in the background, or all programs which are running, or system garbage or caching. Executing the cleanup operation to clean up the content includes: for example, closing the program which is running in the background, or closing all applications which are running, or deleting all system garbage and caching. In the case that the electronic device further includes a display unit, the content which requires to be cleaned up is the content currently displayed on the display unit. The display unit is deformable in response to the wave motion. Here, executing the cleanup operation to clean up the content includes: closing or minimizing the content currently displayed on the display unit, and displaying a desktop.

In the second example, a mode with which the electronic device is triggered to generate the wave motion may be, for example, a trigger mode described in the first situation that the electronic device is trigged at one trigger position, or may be a trigger mode described in the second situation that the electronic device is triggered simultaneously at two trigger positions. A combination of such a trigger mode and the function is close to habits in real life, thereby reducing the cost in leaning gestures such as a shaking operation through which an unneeded matter may be shaken off, and making the control operation more convenient and humanized.

As a third example, the control instruction is executed to achieve a function of switching power states. Specifically, the control instruction is executed to switch a power state of the electronic device from a first power state to a second power state, where the first power state is different from the second power state. Practically, it may also be switched back to the first power state from the second power state when a condition is satisfied. For example, it may be switched from an off state to an on state, or it may be switched from a working state to a sleeping state.

For example, in the case that an environmental parameter is smaller than a threshold, such as a brightness is weaker than a threshold, it is not convenient to search for a keypad on the electronic device in darkness; in this case, a backlight for the keypad on the electronic device may be turned on by triggering the electronic device to deform. The keypad is lighted by triggering the wave motion to deform the electronic device. For another example, when there is a need to turn on a flashlight in darkness, a flashlight application may be opened, e.g., a screen is lighted or an LED light is turned on, by triggering the electronic device to deform. Therefore, a way to turn on the backlight of the keypad on the electronic device and a way to open the flashlight application are similar to a way to light a glow stick, thereby diversifying approaches for waking up the electronic device. The glow stick generally has a strip shape, packaged with polyethylene. A glass tube is built in the glow stick, where fluids inside and outside the glass tube are respectively a peroxide and an ester compound. Once the glass is broken due to bending, striking, rubbing or the like, the two fluids react with each other to make a fluorescent dye fluoresce. In this way, power consumption of the electronic device increases, that is, the electronic device is switched from a low power state to a high power state. Practically, it may also be triggered to switch from the low power state to the high power state only based on deformation rather than based on the environmental parameter.

In the third example, the mode in which the electronic device is triggered to generate the wave motion may be, for example, the above trigger mode described in the second situation, i.e., triggering simultaneously at two first regions. This trigger mode may generate a large deformation and is more similar to the way to light the glow stick, thereby reducing the learning cost.

Several types of control instructions and examples of executing these control instructions are described above. In practice, executing the control instruction may include: answering a phone and hanging up the phone; or paging up and paging down; or going to a previous one and going to a next one; or going forward and going backward. The trigger mode corresponding to such a control instruction may be, for example, the above trigger mode described in the second situation, i.e., triggering alternatively at the two first regions. In this case, the wave motion is triggered at opposite sides or opposite corners of the electronic device, thereby respectively corresponding to two aspects of one event, such as going forward and going backward. Therefore, this design is better in accordance with operation habits of the user, thereby making the operation more convenient and humanized.

A case that the electronic device itself executes the control instruction is described above. In practice, the electronic device may send the control instruction to another electronic device, to make the control instruction executed at the another electronic device and achieve functions including the individual functions described above at the another electronic device. Here, the electronic device may serve as an input control device, and may not include a display unit.

According to another embodiment, in the case that the electronic device is triggered to move as a whole, that is, no deformation or wave motion is transmitted in the electronic device, another control instruction may be determined based on the movement. The another control instruction is different from the control instructions described above. For ease of description, the control instructions in the former embodiments are referred to as a first kind of control instruction, and the another control instruction in the embodiment is referred to as a second kind of control instruction, the first kind of control instruction being different from the second kind of control instruction.

Based on a same conception, an electronic device is further provided according to an embodiment of the disclosure. The electronic device is a deformable electronic device. As show in FIG. 7, the electronic device includes: a main body 301; a parameter acquisition unit 302 arranged on the main body 301, where the parameter acquisition unit 302 is for acquiring, in the case that a wave motion transmitted gradually from a first region of the electronic device to a second region of the electronic device occurs in the electronic device, a parameter related to the wave motion; and a processing unit 303 arranged in the main body 301, where the processing unit 301 is for determining a control instruction at least based on the parameter. The control instruction may be executed to implement a function corresponding to the control instruction.

Figure 7:
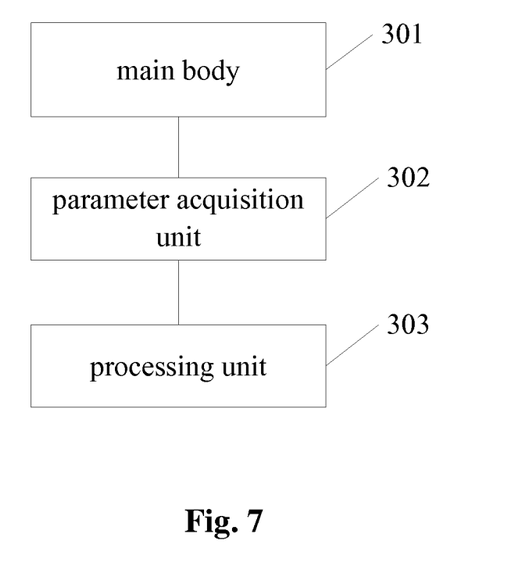
FIG. 7 is a functional block diagram of an electronic device according to an embodiment of the disclosure.

Optionally, the parameter acquisition unit 302 includes multiple sensors, and data collected by at least two of the multiple sensors at a same time instant are different, and data collected by at least two of the multiple sensors at different time instants are consistent.

Optionally, the parameter acquisition unit 302 is for, in the case that the wave motion is triggered at the first region, acquiring amplitude, frequency, and times of the wave motion in the first region through a detection; or in the case that the wave motion is triggered at the first region, acquiring amplitude, frequency, and times of the wave motion in at least one predetermined region different from the first region through a detection; or acquiring quantity of convex portions and concave portions generated by the wave motion in a wave motion process through a detection.

Optionally, the electronic device further includes a position determination unit for determining a position of the first region in the case that the wave motion is triggered at the first region. The processing unit 303 is for determining a control instruction based on the position and the parameter.

Further, the position determination unit is for, in the case that there is one first region, determining that the first region is located at one side, one corner or the central region of the electronic device; or in the case that there are two first regions, determining that the first regions are located at opposite sides or opposite corners of the electronic device.

Optionally, the electronic device further includes a display unit which is deformable in response to the wave motion, and the processing unit 303 is further for executing the control instruction to determine a display object at a first position on the display unit, determining a second position on the display unit, and adjusting a display position of the display object from the first position to the second position.

Further, the processing unit 303 is for, determining a direction of gravity and determining a second position based on the first position and the direction of gravity, where a direction from the first position to the second position is same as the direction of gravity; or determining a transmission direction of the wave motion and determining a second position based on the first position and the transmission direction, where a direction from the first position to the second position is same as the transmission direction.

Optionally, the processing unit 303 is for executing the control instruction, to determine a content which requires to be cleaned up and executing a cleanup operation to clean up the content.

Optionally, the processing unit 303 is further for executing the control instruction to switch a power state of the electronic device from a first power state to a second power state, where the first power state is different from the second power state.

Further, in practice, the processing unit 303 may be arranged on a circuit board of the electronic device. The processing unit 303 may be a same physical element as a processor of the electronic device, or may be a physical element different from the processor. User operation associated with the electronic device may be acquired by a camera or a touch unit.

The electronic device may further include other elements, such as a memory for storing data required by the processing unit 303, and a user interface which may be used to connect an external device such as a headset and a speaker.

Figure 1:
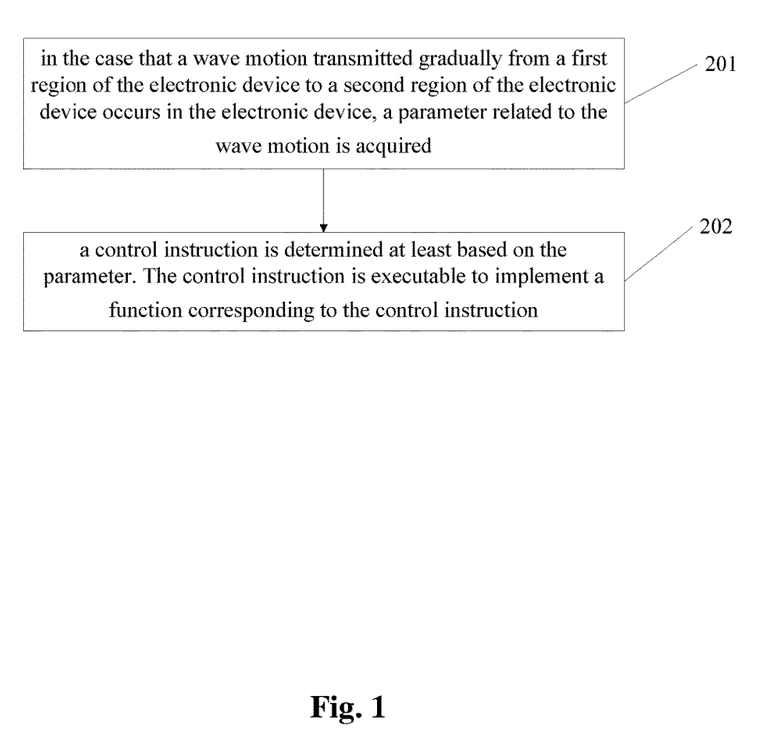
FIG. 1 is a flowchart of a method for controlling an electronic device according to an embodiment of the disclosure.

Various variations and examples in the above method for controlling the electronic device according to the foregoing embodiment in conjunction with FIG. 1 are also applicable to the electronic device according to the embodiment. With the above detail description of the method for controlling the electronic device, those skilled in the art can clearly understand implementations for the electronic device in the embodiment, which are not repeated here for clarity.

According to the embodiments of the disclosure, for the deformable electronic device, in the case that the wave motion transmitted gradually from the first region of the electronic device to the second region of the electronic device occurs in the electronic device, the parameter related to the wave motion is acquired, and the control instruction is determined at least based on the parameter. The control instruction may be executed to implement a function corresponding to the control instruction. As illustrated, the method according to the embodiment determines the control instruction based on the wave motion that occurs in the electronic device; hence controlling of the electronic device is tightly combined with a deformable characteristic of the electronic device and this control method is novel. Further, this control method can be used as long as the wave motion occurs in the electronic device, thereby simplifying multiple steps in a conventional control method, and causing a convenient and humanized control method.

Computer program instructions corresponding to the method for controlling the electronic device according to the embodiment as shown in FIG. 1 may be stored on a storage medium such as an optical disk, a hard disk or a U-disk.

When the computer program instructions corresponding to the method for controlling the electronic device stored in the storage medium is read or executed by an electronic device, the following steps may be performed:

in the case that a wave motion transmitted gradually from a first region of the electronic device to a second region of the electronic device occurs in the electronic device, acquiring a parameter related to the wave motion; and determining a control instruction at least based on the parameter, where the control instruction may be executed to implement a function corresponding to the control instruction.

Optionally, the electronic device further includes multiple sensors, and acquiring the parameter related to the wave motion includes:

collecting data, by the multiple sensors, to acquire the parameter related to the wave motion, where data collected by at least two of the multiple sensors at a same time instant are different, and data collected by at least two of the multiple sensors at different time instants are consistent.

Optionally, acquiring the parameter related to the wave motion includes:

in the case that the wave motion is triggered at the first region, acquiring amplitude, frequency, and times of the wave motion in the first region through a detection; or in the case that the wave motion is triggered at the first region, acquiring amplitude, frequency, and times of the wave motion in at least one predetermined region different from the first region through a detection; or acquiring quantity of convex portions and concave portions generated by the wave motion in a wave motion process through a detection.

Optionally, in the case that the wave motion is triggered at the first region, the following step is included: determining a position of the first region;

and determining the control instruction at least based on the parameter includes: determining the control instruction based on the position and the parameter.

Further, determining the position of the first region includes:

in the case that there is one first region, determining that the first region is located at one side, one corner or a central region of the electronic device; or in the case that there are two first regions, determining that the first regions are located at opposite sides or opposite corners of the electronic device.

Optionally, the electronic device further includes a display unit which is deformable in response to the wave motion, and the following step is further included:

executing the control instruction to determine a display object at a first position on the display unit, determining a second position on the display unit, and adjusting a display position of the display object from the first position to the second position.

Further, determining the second position on the display unit includes:

determining a direction of gravity and determining a second position based on the first position and the direction of gravity, where a direction from the first position to the second position is same as the direction of gravity; or determining a transmission direction of the wave motion and determining the second position based on the first position and the transmission direction, where a direction from the first position to the second position is same as the transmission direction.

Optionally, after determining the control instruction at least based on the parameter, the following step is further included:

executing the control instruction to determine a content which requires to be cleaned up, and executing a cleanup operation to clean up the content.

Optionally, after determining the control instruction at least based on the parameter, the following step is further included:

executing the control instruction to switch a power state of the electronic device from a first power state to a second power state, where the first power state is different from the second power state.

Apparently, various variations and modifications may be made by those skilled in the art without departing from the spirit and scope of the disclosure. In this way, provided that these modifications and variations of the disclosure are within the scope of the claims of the disclosure and the equivalent technologies thereof, the disclosure intends to include these modifications and variations therein.

The invention claimed is:

1. A method comprising:
acquiring a parameter related to a wave motion associated with an electronic device, in the case that the wave motion transmitted from a first region of the electronic device to a second region of the electronic device occurs; and
determining a control instruction at least based on the parameter, wherein the control instruction is executable to turn on a screen of the electronic device;
wherein said acquiring the parameter related to the wave motion comprises: collecting data, by a plurality of sensors of the electronic device, to acquire the parameter related to the wave motion;
wherein the parameter includes at least one of a quantity of convex portions generated by the wave motion in a wave motion process and a quantity of concave portions generated by the wave motion in the wave motion process; and
wherein data collected by at least two of the plurality of sensors at different times are consistent; and
wherein the first region is a central region of the electronic device, and the wave motion is triggered at the central region; and
wherein the central region is a circular region having a center of the electronic device as the center and having a predetermined radius.

2. The method according to claim 1, wherein the data collected by at least two of the plurality of sensors at a same time are different.

3. The method according to claim 1, wherein said acquiring a parameter related to the wave motion comprises:
acquiring the parameter by detecting amplitude, frequency, or times of the wave motion in the first region, in the case that the wave motion is triggered at the first region; or
acquiring the parameter by detecting amplitude, frequency, or times of the wave motion in at least one predetermined region different from the first region, in the case that the wave motion is triggered at the first region.

4. The method according to claim 1, wherein in the case that the wave motion is triggered at the first region, the method further comprises:
determining a position of the first region; and
wherein said determining a control instruction comprises:
determining the control instruction based on the position and the parameter.

5. An electronic device, comprising:
a main body;
a parameter acquisition unit, which acquires a parameter related to a wave motion in the case that the wave motion transmitted from a first region of the electronic device to a second region of the electronic device occurs, wherein the parameter acquisition unit is attached to the main body; and
a processing unit, which determines a control instruction at least based on the parameter, and the control instruction is executable to turn on a screen of the electronic device, wherein the processing unit is coupled to the main body;
wherein the parameter acquisition unit comprises a plurality of sensors, and data collected by at least two of the plurality of sensors at different times are consistent; and
wherein the parameter includes at least one of a quantity of convex portions generated by the wave motion in a wave motion process and a quantity of concave portions generated by the wave motion in the wave motion process;
wherein the first region is a central region of the electronic device, and the wave motion is triggered at the central region; and
wherein the central region is a circular region having a center of the electronic device as the center and having a predetermined radius.

6. The electronic device according to claim 5, wherein the data collected by at least two of the plurality of sensors at a same time are different.

7. The electronic device according to claim 5, wherein the parameter acquisition unit further:
detects amplitude, frequency, or times of the wave motion in the first region, in the case that the wave motion is triggered at the first region; or
detects amplitude, frequency, or times of the wave motion in at least one predetermined region different than the first region, in the case that the wave motion is triggered at the first region.

8. The electronic device according to claim 5, further comprising:
a position determination unit, which determines a position of the first region in the case that the wave motion is triggered at the first region; and
wherein the processing unit further determines the control instruction based on the position and the parameter.

* * * * *